(12) United States Patent
Jin

(10) Patent No.: US 7,757,509 B2
(45) Date of Patent: Jul. 20, 2010

(54) VERY LOW TEMPERATURE STAINLESS STEEL PLATE UNIT FOR PREPARING AN ON-SITE NATURAL ICE CREAM

(75) Inventor: Seungbok Jin, Cypress, CA (US)

(73) Assignee: Han Mi Trade, Inc., Seoul (KR)

( * ) Notice: Subject to any disclaimer, the term of this patent is extended or adjusted under 35 U.S.C. 154(b) by 968 days.

(21) Appl. No.: 11/526,260

(22) Filed: Sep. 25, 2006

(65) Prior Publication Data

US 2008/0075826 A1    Mar. 27, 2008

(51) Int. Cl.
*F25B 47/00*    (2006.01)
(52) U.S. Cl. .............................. 62/278; 62/197; 62/352; 62/342
(58) Field of Classification Search ................ 62/196.4, 62/197, 277–278, 340–356
See application file for complete search history.

(56) References Cited

U.S. PATENT DOCUMENTS

| | | | | |
|---|---|---|---|---|
| 4,476,146 A | * | 10/1984 | Manfroni | 426/522 |
| 4,561,264 A | * | 12/1985 | Johansson | 62/292 |
| 4,702,611 A | * | 10/1987 | Crossley | 366/343 |
| 5,613,371 A | * | 3/1997 | Nelson | 62/244 |
| 6,485,768 B2 | * | 11/2002 | Feola | 426/231 |
| 6,860,271 B2 | * | 3/2005 | Faries et al. | 128/849 |
| 6,907,743 B2 | * | 6/2005 | Cocchi et al. | 62/68 |
| 6,908,053 B2 | * | 6/2005 | Rupp | 241/86.1 |
| 2005/0173462 A1 | * | 8/2005 | Stumler et al. | 222/380 |

* cited by examiner

*Primary Examiner*—William E Tapolcai
(74) *Attorney, Agent, or Firm*—John K. Park; Park Law Firm

(57) ABSTRACT

A portable instrument for providing an on-site ice cream, comprise of all natural ingredients, in front of a customer is provided. The instrument according to the current application is comprised of; 1) a compressor equipped with a condenser having heat removal capacity of 12,000 BTU/hr, 2) an exit tube, 3) a condenser tube, 4) an expansion valve, 5) an outlet copper tube, 6) a coiled coolant pipe, 7) a stainless steel shallow bowl shape plate welded on the coolant pipes, 8) an inlet copper tube, 9) a separator, 10) a by pass line that connects the exit tube and the outlet copper tube, 11) a solenoid valve, and 12) a foot stepper to control on/off of the solenoid valve. Slurry of a mixture of fruits, milk, cream powder and honey syrup, formed from an electric mixer is dumped on the stainless steel plate, which is maintained at the very low temperature between −31 C to −35 C.

1 Claim, 4 Drawing Sheets

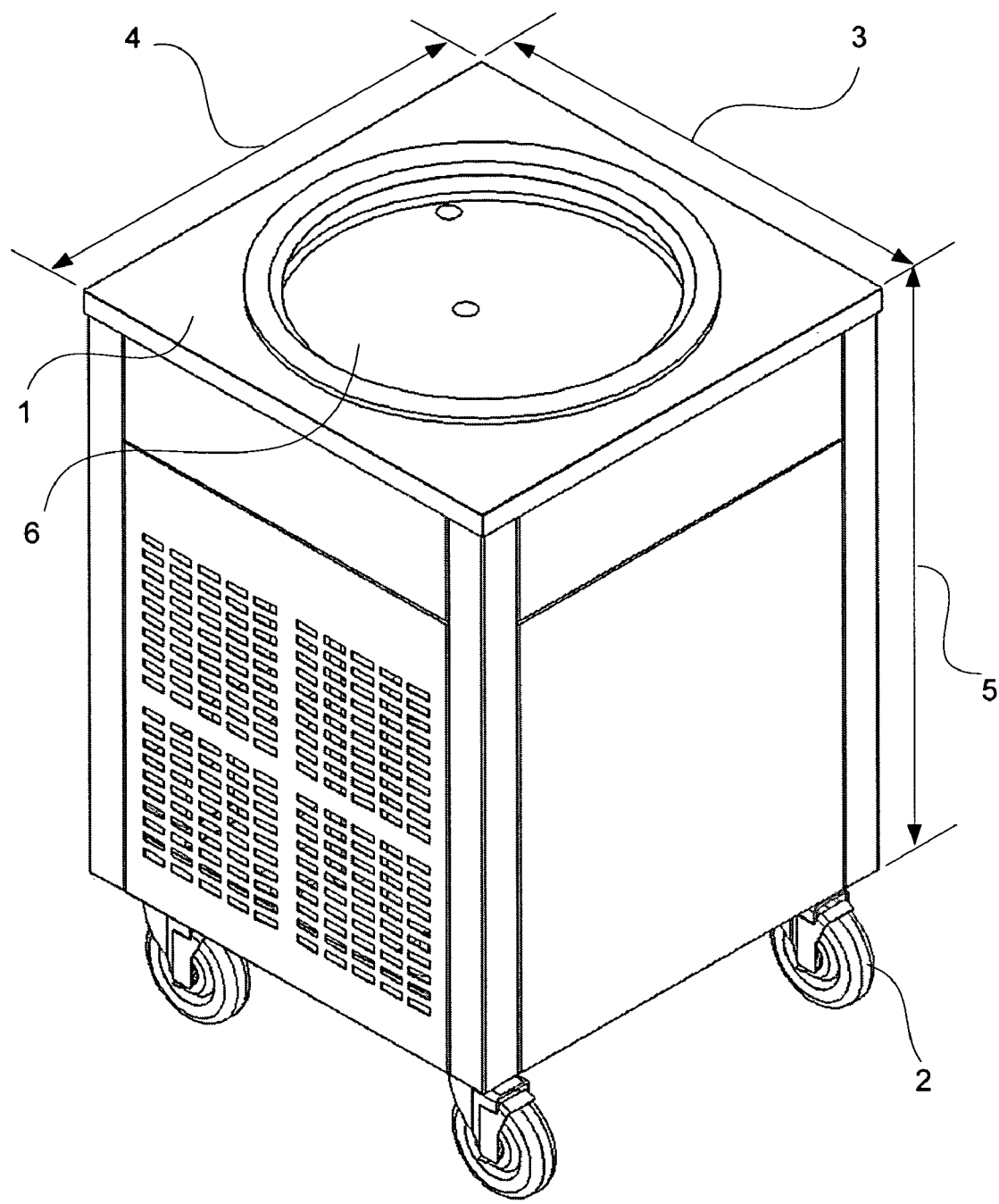
- Fig1 -

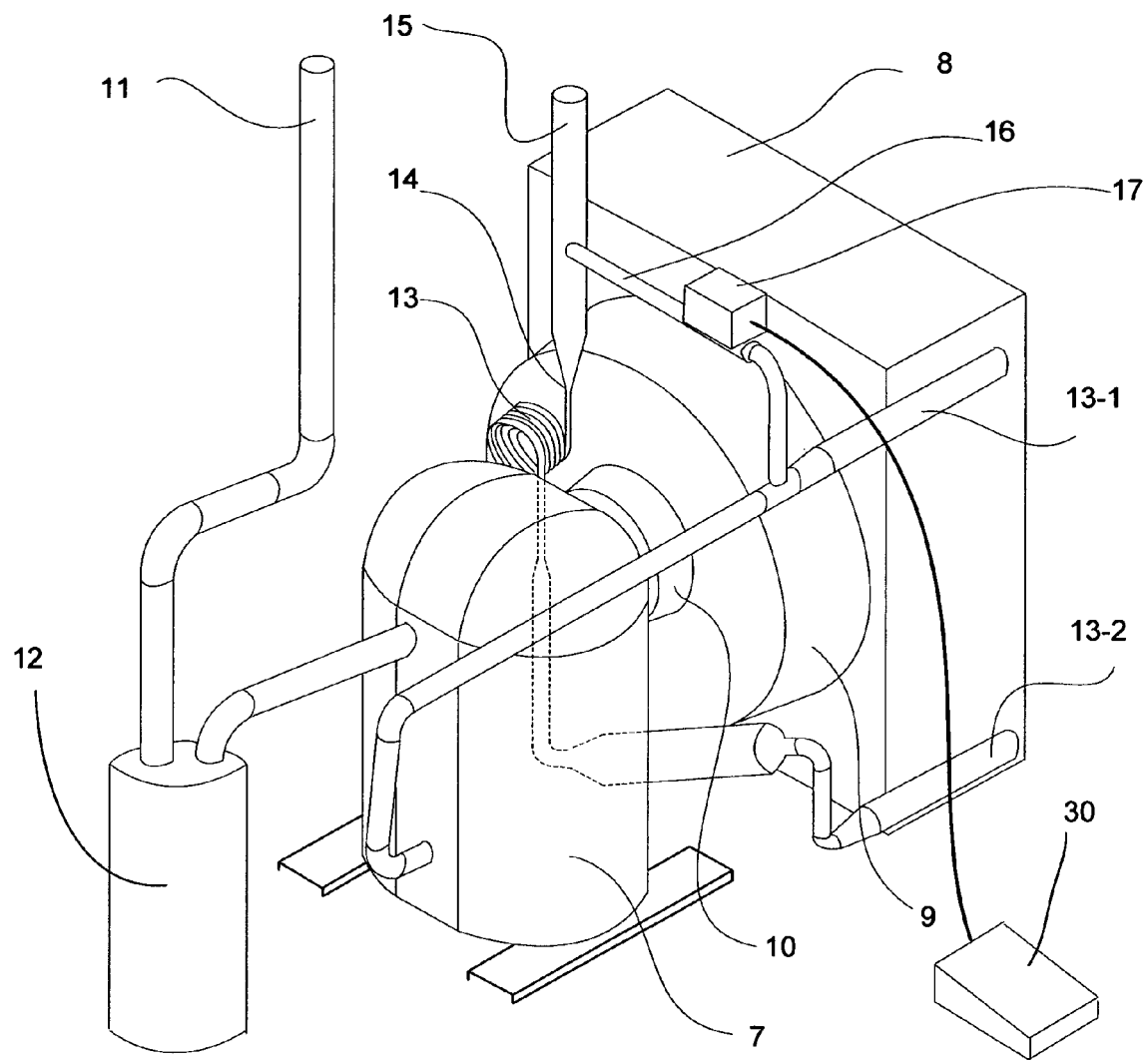
- Fig 2 -

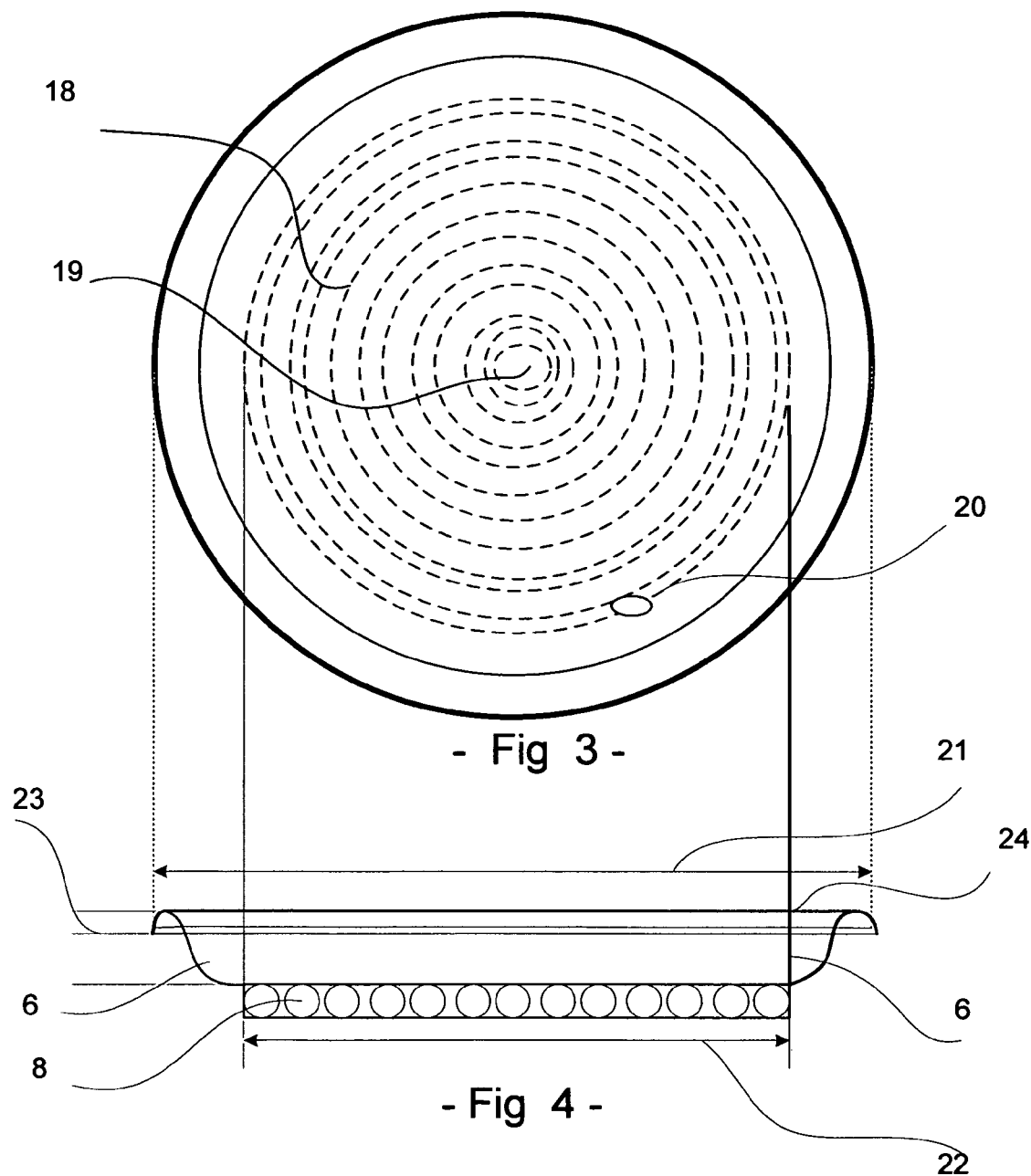

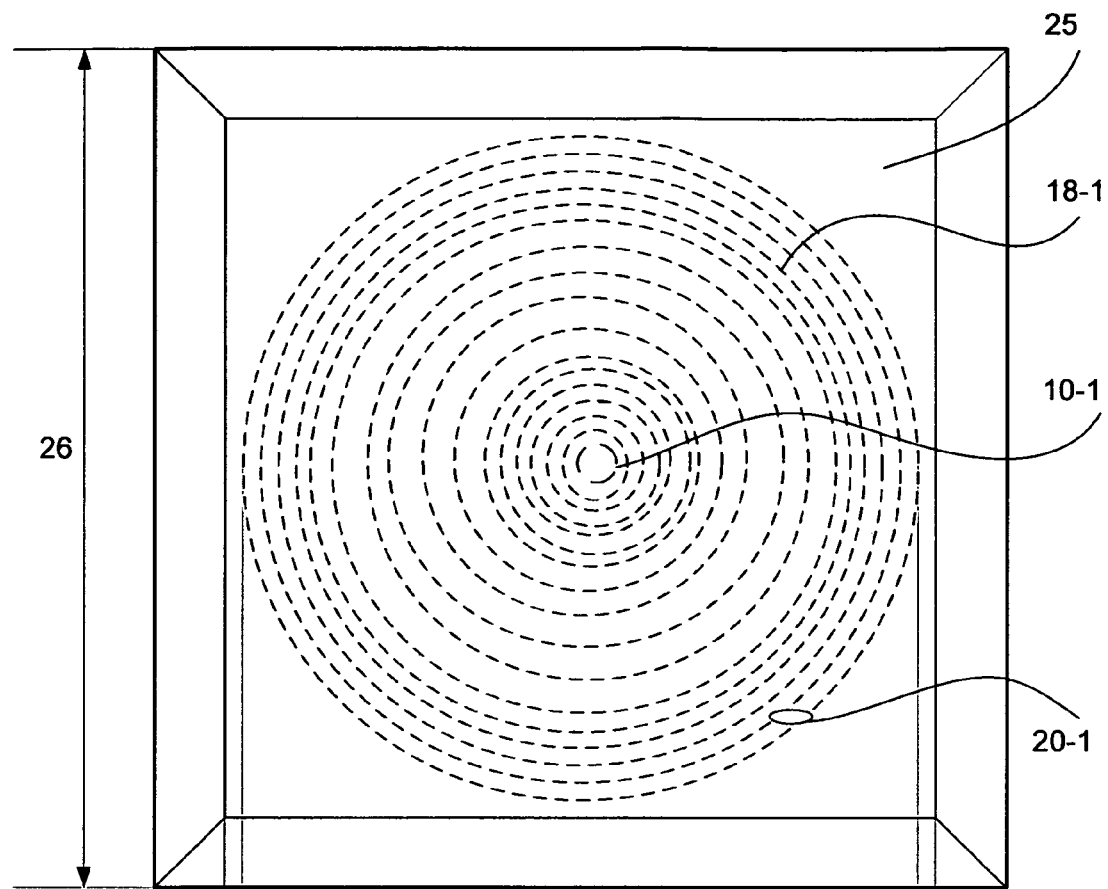
- Fig 5 -
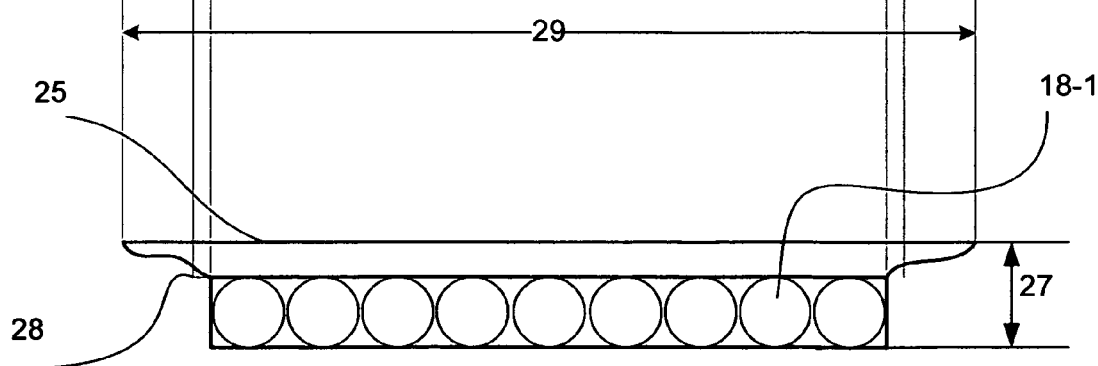
- Fig 6 -

VERY LOW TEMPERATURE STAINLESS STEEL PLATE UNIT FOR PREPARING AN ON-SITE NATURAL ICE CREAM

FIELD OF THE INVENTION

Current application related with an instrument for providing an on-site ice cream comprises of a variety of natural ingredients and, especially related with an instrument having cold stainless plate unit maintained at temperature between −31 C to −35 C.

BACKGROUND OF THE INVENTION

Ice cream is a frozen dairy dessert product that has a minimum of 10% milk fat, 12% milk solids: 12-16% sweeteners: 0.2-0.5% stabilizers and emulsifiers, 55%-64% water which comes from milk solids or other ingredients. These ingredients along with air incorporated during the stirring process, make up ice cream.

Generally, less expensive ice creams contain lower-quality ingredients, and more entrapped air, sometimes as much as 50% of the final volume. Artisan-produced ice creams, such as Berthillon's, often contain very little air, although some is necessary to produce the characteristic creamy texture of the product. Generally speaking, the finest ice creams have between 3% and 15% air.

The mouth feel of softness of ice cream depends not only on the contents of the milk fat, but also depends on the contents of the air. Use of stabilizers rather than actual cream and the incorporation of entrapped air also decrease the fat and caloric contents of less expensive ice creams, making them more appealing to those on diets.

The combination of rigid consumer acceptance criteria, regulatory standards and the complex nature of the interactions which produce an acceptable frozen dessert product, make it difficult to formulate an aerated frozen dessert having improved characteristics, particularly when formulating a reduced or non-fat product containing only natural components and ingredients without added traditional stabilizing gums.

It is particularly desirable for frozen dessert products to be stable against "heat shock," which is cyclic conditions of partial thawing and refreezing which occur during typical storage, shipping and handling of frozen dairy desserts. These cycles of fluctuating temperatures promote ice crystal growth in the dessert product, and a resultant gritty texture to the product. The gritty texture and mouth feel, and diminished appearance detracts from the overall general quality of the product.

Commercially available emulsifiers are generally derived by chemical reaction with naturally occurring glycerides.

It is the purpose of the current application to proved an instrument that enables preparing an on-site ice cream in front of a customer, which is comprise of all natural ingredients and controls the mouth feel of softness by adjusting scrambling time without changing the contents of fats.

DESCRIPTION OF THE PRIOR ART

U.S. Pat. No. 7,081,265 to Wanat, U.S. Pat. No. 6,817,207 to Bonato, et al., U.S. Pat. No. 6,988,372 to Ross, et al. U.S. Pat. No. 6,917,203 to Rischewski, U.S. Pat. No. 6,510,704 to Russell, U.S. Pat. No. 6,298,668 to Lo, U.S. Pat. No. 6,145, 701 to Van Der Merwe, et al., U.S. Pat. No. 6,041,614 to Yamaya, et al., U.S. Pat. No. 5,106,199 to Eckel, et al., U.S. Pat. No. 4,922,728 to Backus, U.S. Pat. No. 4,920,761 to Bukoschek, et al., U.S. Pat. No. 4,799,364 to Meier, et al., U.S. Pat. No. 4,716,822 to O'Brien, U.S. Pat. No. 4,696,166 to Bukoschek, et al., U.S. Pat. No. 4,669,275 to Ohgushi, et al. Illustrate ice cream makers equipped vessels, freezing compressor, and defroster.

U.S. Pat. No. 4,423,604 to Riley illustrates a contact plate freezer. Adjustable spacer means are provided which can change the distance separating consecutive freezing plates within the freezer. This enables a single contact plate freezer to be used on products of various sizes. U.S. Pat. No. 4,180, 987 to Mclaughlin illustrates a spacer bar and spacer for prepackaged food freezers of the multiple flat plate type which enables the spacing between the plates to be quickly changed to accommodate different thickness food packages.

U.S. Pat. No. 3,020,731 and U.S. Pat. No. 2,927,443 to Knowles illustrates plate freezer for packaged foods and spacer between the freezer plates. The freezer is comprised of refrigeratable plates 1 to 17 stacked vertically. Each plate is formed with a top sheet 60 and bottom sheet 61. Between the sheets are places square pipe coils 63. Flexible hoses are connected to each freezing plate to supply cooling medium to each refrigeratable plate. The plates are face to face and super imposed. The stack of plates has up and down movement in a cage and the cage has up and down movement in a frame.

U.S. Pat. No. 2,697,920 to Mackenzie illustrates a refrigerating apparatus for quick freezing food stuffs. The instrument is comprised of vertical stack of refrigerating plates, which are movable away from one another to receive food stuffs to be frozen between them and towards one another to engage the foodstuffs during freezing. Each plate of the stack is connected to extensible refrigerant supply 10 and discharge head 11 preferable mounted on the support 6a at one end of the stack. These headers may be located at the side of the stack of the plates and joined to each plate by flexible conduits 10a and 11a. The headers 10 and 11 are in turn connected to a liquid ammonia refrigerating circuit through connectors 31 and 32 outside the casing. The two headers are constructed from outer tubes 33 and 34 carried by flat form 4 and inner tubes 35 and 36 slid able through leak-proof glands in tubes 33 and 34, respectively. No internal piping in the plate is described.

U.S. Pat. No. 2,445,867 to Kleist illustrated a freezing device for freezing packaged foodstuffs under pressure. On vertical member 3 pluralities of freezing units are slid ably engaged. Each plate has upper wall 6, lower wall 7, and side wall 8. Internal coil 9 is installed inside of the freezing unit 5. All the ice cream makers are comprised of cold chamber and heating chamber. Freezing plate for freezing packed food stuffs have flat surface refrigerating plates stacked vertically. It is impossible to cut and turn over any thing on the surface of the refrigerating plates. None of the prior arts illustrates a method of providing an on-site ice cream, comprise of all natural ingredients, in front of a customer utilizing a stainless steel plate, which is maintained at very low temperature between −31 C to −35 C to control softness of the ice cream without alternating the amount of the cream introduced but by just adjusting the scrambling time and enables an apple ice cream.

SUMMARY OF THE INVENTION

Generally speaking, the finest ice cream has between 3% and 15% air. The mouth feel of softened of ice cream depends not only on the contents of the milk fat, but also depends on the contents of the air. The use of stabilizers rather than actual cream and the incorporation of air also decrease the fat and caloric content of less expensive ice creams, making them more appealing to those on diets. However, customers prefer natural cream. But, it is very hard to make on-site ice cream with natural cream. It is the purpose of the current application to develop an instrument to provide an on-site ice-cream in front of a customer. A portable instrument for providing an on-site ice cream, comprise of all natural ingredients, in front of a customer is comprised of 1) a compressor equipped with a condenser having heat removal capacity of 12,000 BTU/hr, 2) an exit tube, 3) a condenser tube, 4) an expansion valve, 5) an outlet copper tube, 6) a coiled coolant pipe, 7) a stainless steel shallow bowl shape plate welded on the coolant pipes, 8) an inlet copper tube, 9) a separator, 10) a by pass line that connects the exit tube and an outlet copper tube, 11) a solenoid valve, and 12) a foot stepper to control on/off of the solenoid valve.

Slurry of a mixture of fruits, milk, cream powder and honey syrup, formed from an electric mixer, is dumped on the stainless steel plate, which is maintained at the very low temperature between −31 C to −35 C. The slurry freezes very quickly. While the slurry turns into ice, it folded and cut for 40-60 seconds to allow air entrapped in the freezing texture of the slurry. With the instrument of the current invention, is possible to make an apple ice cream, which is impossible to make by prior ice cream making methods.

BRIEF DESCRIPTION OF THE DRAWINGS

FIG. 1 is a perspective view of a very low temperature stainless steel plate unit for preparing an on-site natural ice cream according to current application.

FIG. 2 is a perspective view of a compressor for the very low temperature stainless steel plate unit for preparing an on-site natural ice cream according to current application.

FIG. 3 is an over view of the cold plate showing relative position of the cold plate and cooling coil tube.

FIG. 4 is a side view of the cold plate and cooling coil tube.

FIG. 5 is an over view of another embodiment of the cold plate showing relative position of another embodiment of the cold plate and cooling coil tube.

FIG. 6 is a side view of another embodiment of the cold plate and cooling coil tube.

DETAILED DESCRIPTION OF THE PREFERRED EMBODIMENT

FIG. 1 is a perspective view of a very low temperature stainless steel plate unite (1) for preparing an on-site natural ice cream according to current application. The unit is mounted on four wheels (2) to make it easy to transfer from place to place. Apparent size of the unit (1) is 51 cm width (3) by 51 cm length (4) by 70 cm height (5). A circular dish shape cold plate (6) is placed on the top of the unit (1).

FIG. 2 is a perspective view of a compressor (7) for the very low temperature stainless steel plate unit (1) for preparing an on-site natural ice cream according to current application. The compressor (7) is equipped with a condenser (8), whose heat removal capacity is 12,000 BTU/hr, a fan (9), a motor (10), and is connected to the cold plate (6) via inlet copper tube (11), a separator (12), out let copper coil (13), an expansion valve (14), and outlet copper tube (15).

As is well known, the refrigerant gas is introduced to the compressor (7) through the inlet copper tube (11). After the refrigerant gas is compressed, temperature and pressure of the refrigerant gas increases. By the pressure, the refrigerant gas is transferred to the condenser (8) through an exit tube (13-1), one end of which is connected to the compressor and the other end is connected to the condenser (8). In the condenser (8), as the fan (9) removes the heat from the condenser, temperature of the refrigerant gas is dropped and becomes liquid. The liquefied refrigerant gas passes through a condenser tube (13-2) that carries out liquefied refrigerator from the condenser (8) and delivers it to an outlet copper coil (13) and an expansion valve (14). As the liquefied refrigerant gas pass through the expansion valve (14), the liquefied refrigerant gas absorbs heat from surrounding as it vaporizes. Cold gas of refrigerator passes through an outlet copper tube (15). The condenser (8), whose heat removal capacity is 12,000 BTU/hr, enables controlling the temperature of the cold plate (6) between −31 C to −35 C.

A special by pass line (16) is installed between the compressor (7) and the condenser (8). The by pass line (16) is closed by a solenoid valve (17) in normal operation mode. ON/Off of the solenoid valve (17) is controlled by a foot stepper (30). When the solenoid valve (17) is open, non condensed vapor of refrigerant is introduced to the outlet copper tube (15). Then the temperature of cold plate (6) rapidly increases to above 0° C. to release frozen slurry of fruits, which was stuck to the surface of the cold plate (6), and make it easy to fold and turn over the frozen slurry.

FIG. 3 and FIG. 4 are schematic drawings showing relative positions of the cold plate (6) and cooling coil tube (18). End of the outlet copper tube (15) is connected to one end (19) of a cooling coil tube (18) and another end (20) of the cooling coil tube (18) is connected to the inlet copper tube (11). First embodiment of the cold plate (6) is a circular shallow bowl shape plate. Outer diameter (21) of the plate (6) is 48 cm and inner diameter (22), diameter of the bottom of the plate is, 40 cm. The shallow bowl shape plate (6) is roundly folded. Outer brim of the plate is steeply rounded and inner brim to the bottom is rounded gently. Height (23) of the hump (24) along the brim of cold plate (6) is 2.5 cm.

The cooling coil tube (18) is spirally wounded and welded to the bottom of the cold plate. One end (19), that is connected with outlet copper tube (15), of the cooling coil tube (18) is located at the center of the lower surface of the cold plate (6) and the other end (20) of the cooling coil tube (18), which is connected with inlet copper tube (11), is located at the lower surface of the outer brim of the cold plate (6). So, the cold refrigerator gas comes into cooling coil tube (18) from the center of the bottom of the cold plate (6), circles around the bottom of the plate to the outer direction and returns to the compressor at the bottom of the plate to the outer direction and returns to the compressor at the outer brim of the bottom of the cold plate (6).

As the temperature of the cold plate (6) is maintained between −31° C. to −35° C., some times slurry of a mixture of fruits, milk, cream powder and honey syrup, formed from an electric mixer, which is dumped on the stainless steel plate, freezes quickly and stick to the plate. Then an operator of the unit (1) press the foot stepper (30) to increase the temperature of the cold plate (6) near to 0° C. to make it easy to cut and turn over the frozen slurry.

Then, the solenoid valve (17) is open and non-condensed hot pressurized gas of the refrigerant pass through the by pass line (16), the solenoid valve (17) and reach the cooling coil tube. Then condensed liquid droplets of the refrigerant are entrained in the hot gas stream from the by pass line (16). If the liquid droplets of the refrigerant are introduced directly to the compressor (7), they damage the compressor (7). To avoid such situation, a separator (12) is installed between the compressor (7) and the inlet copper tube.

FIG. 5 and FIG. 6 are schematic drawings of another embodiment of the cold plate (25) and cooling coil tube (18-1). The cold plate (25) of another embodiment of the current invention is in a square shallow bowl. Length (26) of one outer side of the square is 50 cm. Depth (27) of the cold plate (25) is 3 cm. Bottom of the cold plate (25) is also in a square shape. Length (29) of one side of the square of the bottom of the cold plate (25) is 44 cm. The cooling coil tube (18-1) is spirally wounded and welded to the bottom of the cold plate. One end (19-1), that is connected with outlet copper tube (15), of the cooling coil tube (18-1) is located at the center of the lower surface of the cold plate (25) and the other end (20-1) of the cooling coil tube (18), which is connected with inlet copper tube (11), is located at the lower surface of the outer brim of the cold plates (25). So, the cold refrigerator gas comes into the cooling coil tube (18-1) from the center of the bottom of the cold plate (25), circles around the bottom of the plate to the outer direction and returns to the compressor at the outer brim of the bottom of the cold plate (25).

What is claimed is:

1. A portable instrument for providing an on-site ice cream, comprise of all natural ingredients, at a temperature range of −31° C. to −35° C. in front of a customer is comprised of;
   a compressor equipped with a condenser having heat removal capacity of 12,000 BTU/hr, and
   an exit tube one end of which is connected to the compressor and the other end is connected to the condenser to carry compressed refrigerator gas from the compressor to the condenser, and
   a condenser tube that carries out liquefied refrigerator from the condenser and delivers it to an outlet copper coil, and
   an expansion valve, where the liquefied refrigerator evaporates, and
   an outlet copper tube, one end of which is connected to the expansion valve, and
   a coiled coolant pipe, one end of which is connected to the outlet copper tube and the other end is connected to an inlet copper tube, and
   a stainless steel shallow bowl shape plate welded on the coolant pipes, and
   an inlet copper tube, and
   a separator that collects liquefied refrigerant droplets and evaporates them, and
   a by pass line that connects the exit tube and an outlet copper tube, and
   a solenoid valve that close and open the by pass line, and
   a foot stepper to control on/off of the solenoid valve.

* * * * *

(12) EX PARTE REEXAMINATION CERTIFICATE (9968th)
United States Patent
Jin

(10) Number: US 7,757,509 C1
(45) Certificate Issued: Dec. 3, 2013

(54) VERY LOW TEMPERATURE STAINLESS STEEL PLATE UNIT FOR PREPARING AN ON-SITE NATURAL ICE CREAM

(75) Inventor: Seungbok Jin, Cypress, CA (US)

(73) Assignee: Han Mi Trade, Inc., Seoul (KR)

Reexamination Request:
No. 90/012,902, Jul. 15, 2013

Reexamination Certificate for:
Patent No.: 7,757,509
Issued: Jul. 20, 2010
Appl. No.: 11/526,260
Filed: Sep. 25, 2006

(51) Int. Cl.
*F25B 47/00* (2006.01)
(52) U.S. Cl.
USPC .......... 62/278; 62/197; 62/352; 62/342
(58) Field of Classification Search
None
See application file for complete search history.

(56) References Cited

To view the complete listing of prior art documents cited during the proceeding for Reexamination Control Number 90/012,902, please refer to the USPTO's public Patent Application Information Retrieval (PAIR) system under the Display References tab.

*Primary Examiner* — Joseph A. Kaufman

(57) ABSTRACT

A portable instrument for providing an on-site ice cream, comprise of all natural ingredients, in front of a customer is provided. The instrument according to the current application is comprised of; 1) a compressor equipped with a condenser having heat removal capacity of 12,000 BTU/hr, 2) an exit tube, 3) a condenser tube, 4) an expansion valve, 5) an outlet copper tube, 6) a coiled coolant pipe, 7) a stainless steel shallow bowl shape plate welded on the coolant pipes, 8) an inlet copper tube, 9) a separator, 10) a by pass line that connects the exit tube and the outlet copper tube, 11) a solenoid valve, and 12) a foot stepper to control on/off of the solenoid valve. Slurry of a mixture of fruits, milk, cream powder and honey syrup, formed from an electric mixer is dumped on the stainless steel plate, which is maintained at the very low temperature between −31° C. to −35° C.

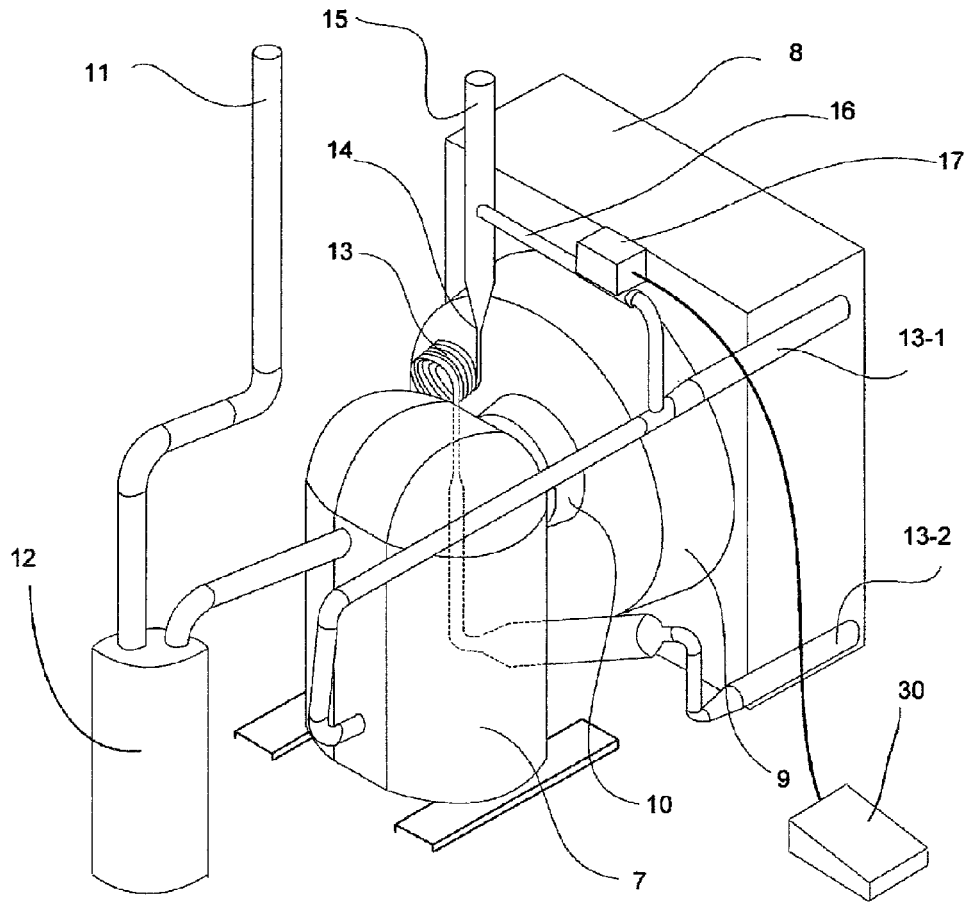

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

\* \* \* \* \*